June 16, 1959   A. SMITH ET AL   2,890,562
LAWN EDGER
Filed May 2, 1955
FIG. 1
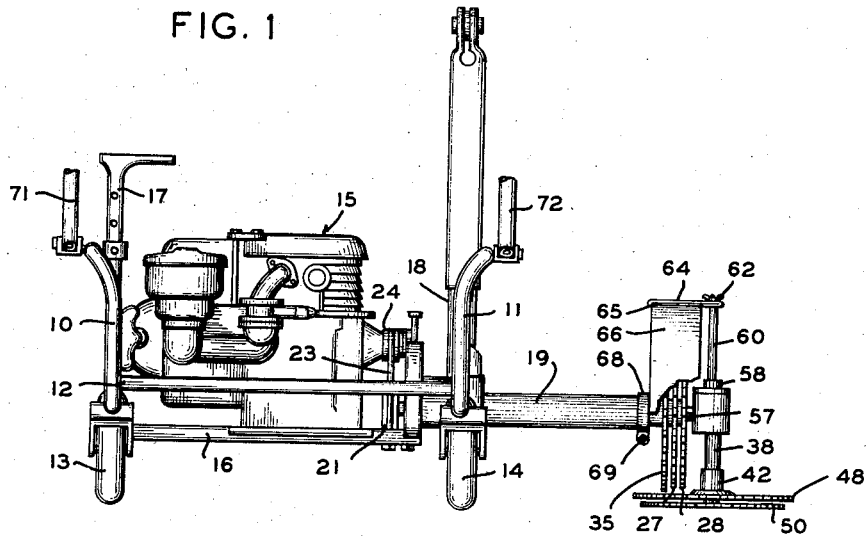
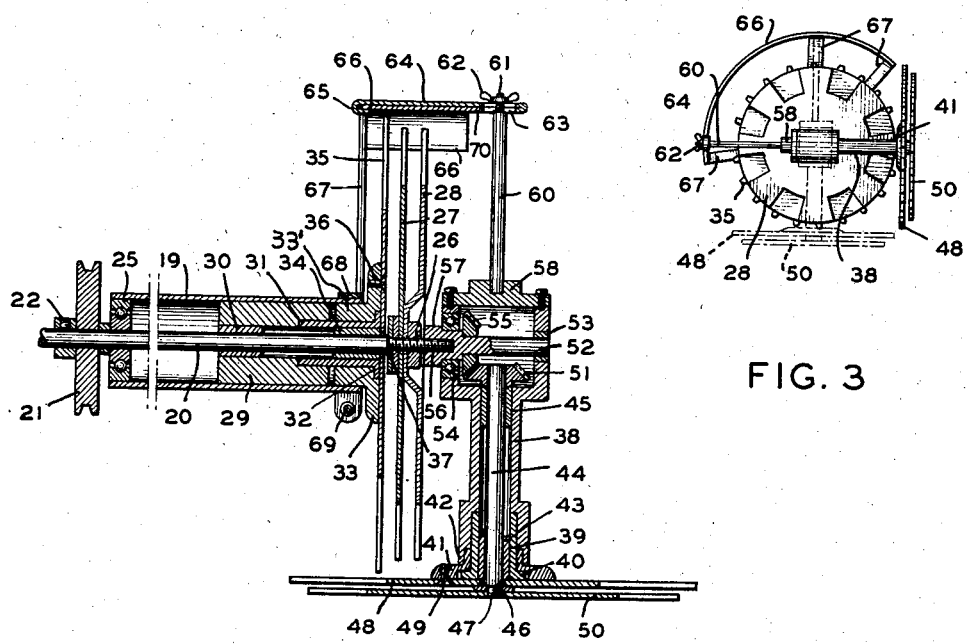
FIG. 3
FIG. 2
INVENTORS
ALEXANDER SMITH
BURTON D. BAGGS, JR.
BY
ATTORNEY

United States Patent Office 2,890,562
Patented June 16, 1959

2,890,562
LAWN EDGER

Alexander Smith and Burton D. Baggs, Sanford, Fla.

Application May 2, 1955, Serial No. 505,376

12 Claims. (Cl. 56—25.4)

The present invention relates to power machinery, and more particularly, to surface treating equipment particularly designed for use in gardening, edging a lawn around flower beds, sidewalks, and, upstanding projections such as buildings, tombstones and the like.

Heretofore, various types of machines and hand implements have been used for edging adjacent sidewalks and flower beds but none has met the needs of the landscape gardener.

An object of the present invention is to produce a surface treating machine which is selectively usable to edge a lawn adjacent a sidewalk and adjacent a flower bed, tombstones, buildings or the like.

Another object of the invention is to provide a power driven cutting disk with a guarding wheel mounted independently of the power shaft so that there is no tendency for the guarding wheel to rotate.

A further object is to provide a gardening machine which has two sets of cutting implements arranged in angular relation and which may be selectively or simultaneously used.

A further object of the invention is to provide an attachment for previously known lawn edgers for working on a flat surface either as a cutter or cultivating device.

Another object of the invention is to provide bearing supporting structure for a power shaft to increase the rigidity thereof.

Further objects and advantages will be apparent as the description proceeds and upon reference to the drawing wherein:

Fig. 1 is a front view of the gardening machine with the attachment mounted thereon;

Fig. 2, an enlarged longitudinal section of the drive shaft and its housing with the attachment in vertical position and also shown in section with parts omitted and parts broken away; and Fig. 3, an end view of the attachment in one position, with a dotted line showing another position.

Briefly, the present invention includes a vehicle having a generally horizontally extending shaft housing with a power shaft therein and ground working disks on a projecting end of the power shaft with means to drive the power shaft and means to adjust the angularity of the shaft and its housing relative to the ground and relative to the direction of movement of the vehicle. A guarding disk is mounted on the housing independently of the power shaft so there is no tendency for the guarding disk to rotate. An attachment is provided for mounting on the projecting end of the power shaft, such attachment including a hollow body carrying a stub shaft connectable to the power shaft and a radially extending shaft carrying a ground working disk with suitable gearing to drive the radial shaft from the stub shaft and a guarding disk rotatably mounted on the hollow body to prevent the cutting disk from marring obstructions such as tombstones and the like.

Referring more particularly to the drawing a vehicle including inverted U-shaped side frames 10 and 11 and transverse members 12 is supported by front caster wheels 13, 14 and rear wheels. A motor 15 supported on a cradle 16 is vertically and angularly adjustable by apertured rod 17 and slidable shaft 18 whereby the motor may be raised or lowered and pivoted about shaft 18 to various angles relative to the ground and to the direction of movement of the vehicle.

A shaft housing 19 is fixed to the cradle 16 and rotatably supports a power shaft 20 driven by means of a pulley 21 fixed to the shaft by a set screw 22 or the like and driven from the motor through a belt 23 driven by pulley 24 on the motor shaft. The inner end of the shaft 20 is rotatably supported by means of an antifriction and thrust bearing 25 or the like. The shaft 20 has its outer end projecting from the outer end of the housing 19 and is provided with a threaded portion 26 on which cutting disks 27, 28 are secured by suitable means such as nut and washers as described in the previous applications. For rotatably supporting the outer end of shaft 20 a sleeve 29 is mounted within the housing 19 and has a first bearing 30 at its inner end and a second bearing 31 provided with a flange 32 extending outwardly of the sleeve and shaft housing. A wheel hub 33 has a boss 33′ with said boss extending into housing 19 for preventing dirt from entering said housing; said wheel hub is rotatably mounted on the outer periphery of the second bearing 31 being retained thereon by a flange 32, a third bearing 34 being mounted on the inner periphery of the second bearing 31 rotatably supporting the outer end of the shaft 20. A star wheel 35 is removably secured to the wheel hub 33 by machine screws 36, the shaft 20 being provided with a shoulder 37 outwardly of the outer surface of the star wheel 35 against which shoulder the washers and cutting disks 27 and 28 are urged by the retaining nut.

An attachment comprising a hollow elongated body 38 for mounting in a generally radial direction from the shaft 20 is provided with a tubular bushing 39 having a flange 40 at its outer end, the body 38 being bored to receive the bushing 39 with a pressed fit, a second wheel hub 41 being rotatably mounted on the outer periphery of the bushing 39 with the hub portion thereof being received within a skirt portion 42 formed by an enlarged bore in the body 38 whereby dirt is prevented from coming into contact with the hub portion 41, the hub being retained on bushing by the flange 40. A bearing 43 is mounted within the tubular bushing 39 and rotatably supporting a radially extending shaft 44, a second bearing 45 being provided for rotatably supporting the inner end of shaft 44. The outer end of radial shaft 44 is provided with a shoulder 46 and a threaded extension 47, the shoulder 46 being located outwardly of a guard wheel 48 which is removably secured to the hub 41 by machine screws 49. At least one cutting element which may be in the form of a tooth disk 50 is secured to the threaded extension 47 in a suitable manner as by having a threaded central portion or by the use of an additional nut or the like. A beveled gear 51 is fixed to the inner end of shaft 44 by any suitable means such as a keyway or the like. The upper portion of the body 38 provides a gear casing in which a stub shaft 52 is rotatably mounted in bearings 53, 54 and the stub shaft 52 has a beveled gear 55 fixed thereto which meshes with and drives beveled gear 51. The stub shaft 52 is provided with a threaded inner bore 56 which threadedly receives shaft extension 26, the inner end of the stub shaft 52 being provided with polygonal outer surface 57 which serves as a nut for applying and removing the attachment.

The gear box of the hollow body 38 is closed by a cover 58 which has an outwardly projecting rod 60 with a threaded extremity 61 which carries a wing nut 62, such threaded extremity 61 passing through a slot 63 in a bent-over portion of a retaining clip 64, the other end of the retaining clip being provided with a hook 65 which engages the inner edge of a guard 66, the guard 66 being in the form of an arcuate fender with radially projecting supporting spokes 67 which converge into a strap 68 forming a hub which surrounds the outer end of the housing 19 and being held in clamping relation by means of a bolt 69 passing through the free extremities of the strap in a well known manner similar to conventional hose clamps whereby the angularity of the fender may be adjusted as desired and fixed in position. The retaining clip 64 and the inner end or shoulder 70 of the bent-over portion of the clip with rod 60 and nut 62 positively retains the body 38 in adjusted position.

From the above description it is believed that the operation of the present machine is obvious. The machine may be used without the attachment by loosening the nuts 57 and 62 and removing the attachment, the machine may then be used with the guarding wheel or disk 35 serving to prevent contact of the rotating cutter blades 27 and 28 with hard objects such as a marker in a cementery, side walks or the like. The star shaped guarding wheel 35 is freely rotatable and being out of contact with the rotating shaft 20 will remain substantially stationary unless such guarding wheel engages an obstruction in which case it will raise the housing 19 and the cutter disks 27 and 28 out of contact with the obstruction. In the prior devices friction between the power shaft and the guarding wheel cause the guarding wheel to rotate resulting in vibration due to the rotation of the unbalanced guarding wheel with the eccentric weight thereon. The guarding wheel 35 therefore prevents marring of obstructions while the sharp teeth thereon permit penetration of the earth a sufficient amount so that the cutting disks 27 and 28 will produce sufficient cutting into the earth to produce a neat trench around the edges of side walks and the like. It will be evident that the angularity of the cutting blades can be adjusted by pivoting the motor supporting cradle 16 and housing 19 about the vertical shaft 18 by putting the body of adjusting rod 17 in one of the lugs supported on the inverted U-shaped frame 10, the elevation of the cutting disks being adjustable by means of the rod 17 and the vertical adjustment of shaft 18 controlled by movement of the forked guiding handle shown in part by tines 71, 72 pivoted to the vehicle.

When the attachment is mounted on the threaded extension 26 of the power shaft 20 as shown in the drawing, the cutting disk 50 thereof may be arranged in a horizontal position shown in full lines in Figs. 1 and 2 for smoothing out a surface such as ridges in a road or a path or the like and in this position the cutting disk may serve as a grass trimmer for trimming grass close as to buildings, telephone poles, tombstones or the like since the edges of the teeth of the disk 50 and the speed of rotation thereof are of a character which can accomplish this result.

If desired, the cutting disk 50 and the guarding wheel 48 may be adjusted to a different angular position such as at 45° to the ground for obtaining intermediate cutting action and if desired the attachment may be adjusted to an inoperative position while the cutting disks 27 and 28 are used in a normal manner. The adjustment being obtained by the retaining clip 64 and/or the strap 68 whereby the parts may be adjusted to more exaggerated positions if desired. The rod 60 may extend at a different angle such as a right angle to shaft 44 to allow for a different range of adjustment.

What is claimed is:

1. A gardening implement comprising a vehicle for movement along the ground, a generally horizontally extending shaft housing mounted on said vehicle and projecting outwardly therefrom; a shaft within said housing and projecting outwardly beyond the outer end of said housing, means on said shaft for attachment of cultivating implements, means to rotatably support said shaft at the outer end of said housing, said means including a sleeve within said housing secured to the inner periphery thereof, a first bearing at the inner end of said sleeve rotatably supporting said shaft, a second bearing mounted on the outer end of said sleeve and projecting laterally outwardly therefrom, said outer bearing including a radially extending flange at its outer end, a wheel hub rotatably mounted on the outer periphery of said second bearing with the hub portion extending within said housing and being retained by said laterally extending flange of said second bearing, a third bearing mounted within and engaging the inner periphery of said second bearing rotatably supporting said shaft, and a star wheel removably mounted on said wheel hub whereby said wheel hub and said star wheel may freely rotate regardless of the rotation of said shaft, said attaching means on said shaft having a shoulder outwardly of said star wheel and being threaded from said shoulder to its outer end.

2. The invention according to claim 1 in which the outwardly projecting portion of the shaft is provided with screw threads for securement to an attachment, said attachment comprising an elongated hollow body for extension generally radially from the outer end of said shaft, said body including a first tubular bushing mounted at the outer end of said body, said bushing having a flange at its outer end, a second wheel hub rotatively mounted on the outer periphery of said tubular bushing and retained against axial movement by said radial flange, and a bearing mounted within said tubular bushing, said outer end of said hollow body embracing a portion at least of said wheel hub, a second bushing mounted within said tubular portion of said housing, a radially extending shaft rotatively mounted in said bushings, one end of said shaft projecting outwardly from said second wheel hub and having a shoulder spaced outwardly from said wheel hub and a reduced threaded extension projecting beyond said shoulder, a guard wheel mounted on said second wheel hub and lying wholly within a plane radially inward from said shoulder and at least one cutting disc on the outer end of said shaft and secured to said threaded extension, said hollow body including a chamber providing a gear box, a bevel gear fixed on said radial shaft adjacent the second bushing and within said gear box, a stub shaft mounted in said body and having a bevel gear in mesh with said attachment shaft, bearings supporting said stub shaft on opposite sides of said stub shaft gear, thread means associated with said stub shaft for removably securing one end of said stub shaft to the threaded end of said horizontally extending shaft, and means reacting between said housing and said body of said attachment to adjust and maintain said body in various angular positions whereby the guarding wheel and cutting wheel on said attachment may be moved to various angular positions from the lowermost horizontal position to various vertical positions.

3. A gardening implement comprising a shaft housing, a shaft rotatably mounted within said housing projecting outwardly beyond one end of said housing, a cultivating implement, means associated with said shaft to secure said cultivating implement to one end of said shaft, a fixed bearing in said housing rotatably supporting said shaft, a second bearing mounted on said housing projecting outwardly from said one end thereof, said second bearing including a radially extending flange at its outer end, a wheel hub rotatably mounted on the outer periphery of said second bearing with the hub portion extending within said housing and being retained by said laterally extending flange of said second bearing, a third bearing mounted within said second bearing and engaging the inner periphery of said second bearing while rotatably supporting said shaft, a guard wheel on said wheel hub and freely rotatable with said hub regardless of the rotation of said shaft, said shaft having a shoulder for abutment against said implement.

4. An attachment for application to the projecting end of a machine shaft comprising a body, said body including bearing means, a shaft rotatably supported in said bearing means, said bearing means including a journal with a radially extending flange, a wheel hub for a guard wheel rotatively mounted on said journal and retained against axial movement by said radial flange, a guard wheel on said wheel hub, said guard wheel overlying a portion at least of said wheel hub, one end of said shaft projecting outwardly from said wheel hub, a cutting implement on said end of said shaft said body having a chamber providing a gear box, a gear fixed on the other end of said shaft within said gear box, a stub shaft having a gear and mounted in said body, bearings supporting said stub shaft on opposite sides of said stub shaft gear, means on said stub shaft to removably secure one end of said stub shaft to the end of said machine shaft to obtain power therefrom.

5. A gardening machine comprising a housing, a shaft rotatably mounted therein, an arcuately shaped fender mounted on the outer end of said housing in adjustable relation thereto, means associated with said shaft to mount cutting tools on the outer end of said shaft, an attachment comprising a body, a stub shaft rotatably mounted in said body for securement to the end of said housing shaft, a driven shaft connected to said stub shaft and carrying a cutting tool at its outer end, means associated with said shaft to rotate said driven shaft from said stub shaft, and means mounted on said body and engageable with said fender for adjusting the angularity of said body whereby said body may be retained in various adjusted positions.

6. An attachment for rotating a shaft from a power shaft comprising a body, a radially extending shaft rotatably mounted in said body, a stub shaft extending outwardly from said body and rotatably mounted therein, gears mounted on said radially extending shaft and said stub shaft for positively driving one from the other, a cutting tool mounted on the outer end of said radial shaft, means associated with said stub shaft to removably fix said stub shaft to the end of a power shaft, a wheel hub, and a guarding disk attached to said wheel hub rotatably mounted on the outer end of said body and out of contact with said shafts and said cutting tool.

7. An attachment for application to a power driven shaft for providing power at right angles to said power driven shaft comprising a hollow body, a stub shaft rotatably mounted on said hollow body and having means for attachment to said main shaft, a radially extending tool carrying shaft rotatably mounted in said body at substantially right angles to said stub shaft, interconnecting gear means for driving said radially extending shaft from said stub shaft, a cutting tool, and means on said shaft for attaching said cutting tool to the radially outward end of said radially extending shaft, and means extending from said body to prevent rotation of said body whereby said body will carry a tool without additional support for operation at right angles to the position of said main shaft, a guarding disk freely rotatably mounted on the outer end of said body and inwardly of the outer end of said radially extending shaft whereby said guarding disk will prevent contact of the cutting tool with hard objects.

8. A power driven cutting device for guarded operation to prevent damage to objects adjacent to material to be cut while effectively cutting said material adjacent said objects comprising a housing, a shaft rotatably mounted in said housing and projecting outwardly therefrom, a hub rotatably mounted on said housing out of contact with said shaft and freely rotatable relative to said housing and to said shaft, said hub having a boss extending into said housing, a guarding disk fixed on said hub and rotatable therewith, a cutting tool fixed on said shaft adjacent said guarding disk for power operation by said shaft, said cutting element being of less diameter than said guarding disk to prevent said cutting element from contacting objects in the path thereof, said guarding disk being provided with teeth along its periphery whereby material may pass through said teeth to contact said cutter.

9. A power driven cutting device for guarded operation to prevent damage to objects adjacent to material to be cut while effectively cutting said material adjacent said objects comprising a housing, a shaft rotatably mounted in said housing and projecting outwardly therefrom, a hub rotatably mounted on said housing out of contact with said shaft and freely rotatable relative to said housing and to said shaft, said hub having a boss extending into said housing a guarding disk fixed on said hub and rotatable therewith, a cutting tool fixed on said shaft adjacent said guarding disk for power operation by said shaft, said cutting element being of less diameter than said guarding disk to prevent said cutting element from contacting objects in the path thereof.

10. An attachment for rotating a shaft from a power shaft rotatably mounted on a supporting body, said power shaft projecting outwardly beyond said body, a stub shaft, means on said stub shaft to mount said stub shaft on the end of said power shaft, a gear housing, means associated with the gear housing to rotatably support said stub shaft in said gear housing, a gear on said stub shaft, a radially extending body projecting from said gear housing, a tool shaft rotatably mounted in said radially extending body, a gear on said tool shaft meshing with the gear on said stub shaft, means extending from said housing to said supporting body for connecting the gear housing to the power shaft supporting body to take the reaction of the gear housing to prevent the gear housing and the radially extending body from rotating with the power shaft, and means on said tool shaft to secure a tool on the tool shaft, and a tool on said tool shaft.

11. The invention according to claim 10 in which a hub is rotatably mounted on the outer end of the radially extending body out of contact with the tool shaft, a guarding disk mounted on said hub for preventing unintentional contact with a tool mounted on said tool shaft.

12. The invention according to the claim 10 in which said means mounting said stub shaft to said power shaft comprises threaded means on said power shaft and cooperating threaded means on said stub shaft.

References Cited in the file of this patent

UNITED STATES PATENTS

| | | |
|---|---|---|
| 793,959 | Rosenberg | July 4, 1905 |
| 1,825,516 | Francyk | Sept. 29, 1931 |
| 2,181,425 | Delaval-Crow | Nov. 28, 1939 |
| 2,263,368 | Sejkora | Nov. 18, 1941 |
| 2,601,366 | Chapman | June 24, 1952 |
| 2,618,919 | Hutchens | Nov. 25, 1952 |
| 2,630,747 | Mintz | Mar. 10, 1953 |
| 2,634,770 | Mall | Apr. 14, 1953 |
| 2,691,264 | Miller | Oct. 12, 1954 |
| 2,697,457 | Lawrence | Dec. 21, 1954 |
| 2,707,858 | Norton et al. | May 10, 1955 |
| 2,719,400 | Lesesne | Oct. 4, 1955 |
| 2,767,541 | Yacoby | Oct. 23, 1956 |